June 24, 1930.  J. R. MAHAN  1,767,538
BACK PRESSURE VALVE FOR DRILL PIPES
Filed June 11, 1928  2 Sheets-Sheet 1

INVENTOR
J. R. Mahan
by F. N. Barber
attorney

June 24, 1930. J. R. MAHAN 1,767,538
BACK PRESSURE VALVE FOR DRILL PIPES
Filed June 11, 1928 2 Sheets-Sheet 2
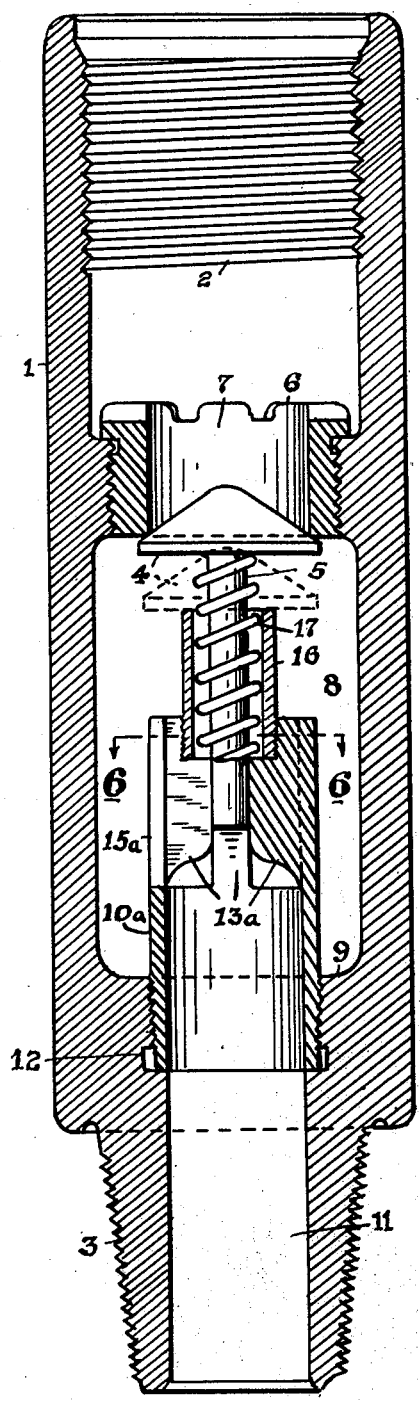
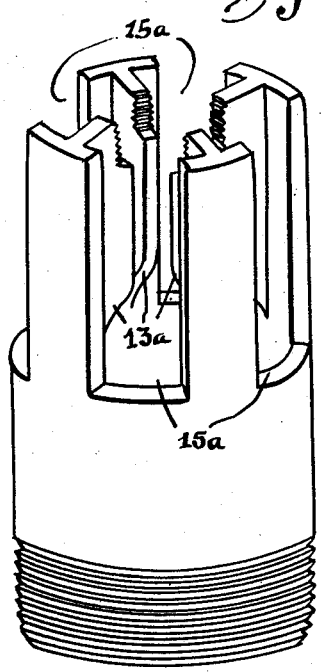
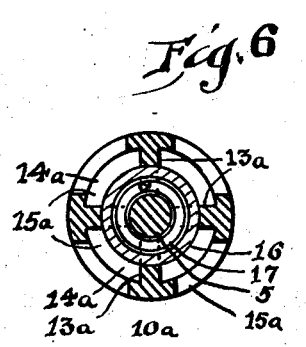
INVENTOR
J. R. Mahan
by F. N. Barker
attorney Patented June 24, 1930

1,767,538

UNITED STATES PATENT OFFICE

JOSEPH R. MAHAN, OF TOLEDO, OHIO, ASSIGNOR TO THE NATIONAL SUPPLY COMPANY, OF TOLEDO, OHIO, A CORPORATION OF OHIO

BACK-PRESSURE VALVE FOR DRILL PIPES

Application filed June 11, 1928. Serial No. 284,389.

My invention relates to back pressure valves for drill pipes.

Drill pipes are sometimes provided with one or more float valves for relieving the couplings, the derrick and other well equipment from strain or injury and for providing safeguards against serious damage to the drill pipes and the wells in case the pipes should be accidentally dropped down the well. One object of this invention is to provide a valve structure which is not liable to become clogged by material carried in suspension by the fluid flowing through the pipe. Another object is to provide a structure which will prevent the valve head from interrupting the circulation of fluid in case the head should break off from its stem. Another object is to provide means whereby the valve seat is entirely unobstructed and will not entrap or collect sand or gravel which has been the cause of considerable trouble in the operation of float valves. Other objects appear hereinafter.

Figure 1:
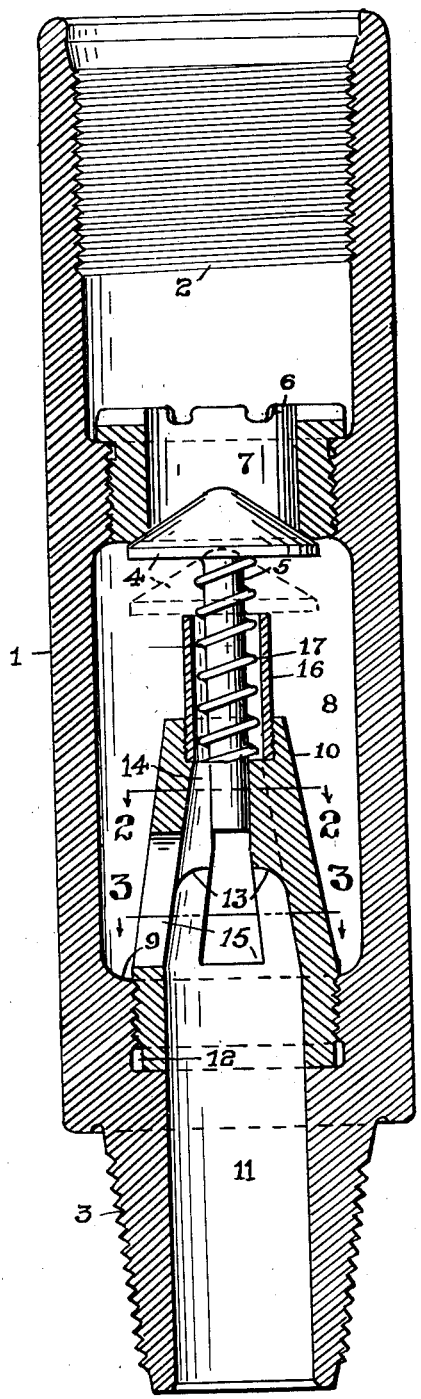
Figure 2:
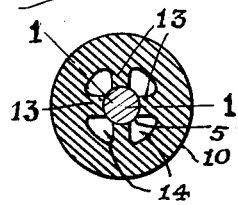
Figure 3:
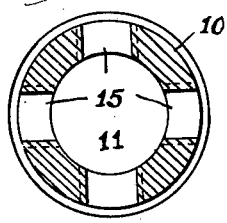

Referring to the accompanying drawing, Fig. 1 is a central vertical section of a special coupling containing a floating valve assembly made in accordance with my invention, the section being on the line 1—1 on Fig. 2. Figs. 2 and 3 are cross-sections of Fig. 1 on the lines 2—2 and 3—3, respectively. Fig. 4 is a central vertical section showing a modified form of my invention; Fig. 5, a perspective of a modified hollow plug or member; and Fig. 6, a section on the line 6—6 on Fig. 4.

On Figs. 1 to 3, 1 designates a special hollow coupling or casing, having the threaded socket 2 at its upper end to which a string of drill pipe is to be attached, and at its lower end the tapered threaded pin 3 to which the drill bit is to be connected either directly or through one or more interposed pipe lengths.

I show a valve of the mushroom type having the upwardly tapering head 4 and the pendent stem 5. The head seats by upward movement against the annular bushing or valve seat 6 which is a ring screwed into threads on the interior face of the casing 1. The seat has a large uninterrupted passage 7, the valve head seating against the lower end thereof adjacent to the said passage.

Within the casing 1 is the large chamber 8 bounded laterally by the wall of the casing and above by the valve head 4 and the valve seat 6 and below by the internal annular shoulder 9 and the lower annular end of the hollow plug or member 10. The lower end of the casing and the pin 3 have the axial continuous passage 11. Between the shoulder 9 and the top of the passage 11 the casing has the annular space 12 whose diameter is greater than that of the passage 11. The interior wall of the space 12 is threaded and receives exterior threads on the lower end of the member 10. The interior surface of the member 10 within the space 12 is continuous or flush with the wall of the passage 11.

The outer surface of the member 10 from about the shoulder 9 upwardly tapers and terminates within the chamber 8 and at some distance below the seat or bushing 6. The interior surface of the member 10 tapers upwardly also and has inwardly projecting vertical ribs 13 providing the vertical passages 14 between successive ribs. The opposing or inner vertical edges of the ribs form a guide for the valve stem 5. The member 10 has vertically elongated lateral ports 15 extending upwardly from near the shoulder 9, these ports tapering upwardly to provide outlets increasing in capacity as the space between the casing 1 and the member 10 decreases.

A vertical tube 16 is screwed into the upper end of the member 10 and is concentric therewith. It encloses the coiled spring 17 which surrounds the valve stem and bears below on the upper ends of the ribs 13 and above against the lower side of the valve head. The tube 16 does not reach the valve head when the latter is on its seat, but forms a stop for the valve head when moved in its opening direction. The tube does not overlap the passages 14, as shown in Fig. 1.

When a drill string is floated into a well hole, the valve prevents the well fluid from passing up through the string, but opens readily when fluid is forced down through the string in a manner readily understood by those acquainted with the well drilling art.

When fluid descends through the drill string past the valve head, the latter acts as a baffle or guide to direct the sand and other coarse matter outwardly away from the tube 16. As the fluid descends through the chamber 8 most of it passes down between the casing 1 and the member 10 and out through the passages 15 and down the passage 11. Some of the fluid enters the tube 16 and passes through it and the passages 14 and into the passage 11. The passage of the fluid down the tube and the passages 14 prevents the collection of sand and the like tending to prevent the action of the valve stem and the spring.

Preferably the member 10 is screwed down so as to rest on the bottom of the space 12 in order to take downward strains off from the screw-threads.

In case the valve head should become broken off from the stem 5, it would drop down into the annular space around the member 10 and would at most clog one of the ports 15 and if it should lodge between two ports, it would not clog any of the ports.

Referring now to Figs. 4 to 6, the parts are the same as in Fig. 1 except as to the hollow plug or member marked 10 on Figs. 1 to 3 and 10$^a$ on Figs. 4 to 6. The plug 10$^a$ is cylindrical and its ports 15$^a$ are shown extending from their bases entirely to the top of the plug. The sides of the ports 15$^a$ are shown parallel but this is not essential. The ports have their bases at or near the lower ends of the ribs 13$^a$ whose inner edges guide the valve stem 5, so that the fluid which passes the valve head 4 must flow in contact with the sides of the ribs 13$^a$, thereby preventing the spaces 14$^a$ between consecutive ribs becoming clogged by the depositing of solid matter carried by the said fluid. The fluid enters the spaces between the ribs both from the sides and the top of the plug 10$^a$.

I claim—

1. In a coupling in a drill string, a chamber, an annular valve seat at its upper end, a valve in the chamber seating upwardly against the valve seat, and a hollow member projecting upwardly within the chamber and having ports connecting the chamber to the hollow of the member, the hollow of the member being open to the interior of the drill string below the chamber, the space between the hollow member and the wall of the chamber being adapted to receive the valve, if broken off from its stem, without the valve blocking all the ports.

2. In a coupling in a drill string, a chamber, an annular valve seat at its upper end, a valve in the chamber seating upwardly against the valve seat, a member within the chamber, a valve stem connected to the lower side of the valve and guided by an opening in the member, a spring around the stem between the valve and the member, and a tube surrounding the spring and the stem and communicating below with passages in the said member and in communication with the said opening.

3. In a coupling in a drill string, a chamber, an annular valve seat at its upper end, a valve in the chamber seating upwardly against the valve seat, a valve stem connected to the lower side of the valve, a spring tending to move the valve upwardly and a member having a guiding opening for the stem, a passage in the member and in communication with the stem and the opening for fluid to pass from the chamber down into the interior of the drill string below the chamber.

4. In a coupling in a drill string, a chamber, an annular valve seat at its upper end, a valve in the chamber seating upwardly against the valve seat, a spring tending to move the valve toward its seat, a valve stem attached to the under side of the valve, a member having a guiding opening for the stem, and passages in the member and in communication with the opening connecting the chamber to the interior of the drill string below the chamber.

5. In a coupling in a drill string, a chamber, an annular valve seat at its upper end, a valve in the chamber seating upwardly against the valve seat, a valve stem attached to the under side of the valve, a member having a guiding opening for the stem, passages in the member and in communication with an opening connecting the chamber to the interior of the drill string below the chamber, a spring encircling the stem, tending to move the valve toward its seat, and seated on the said member, and a tube surrounding the spring and attached to the said member, the top of the tube not reaching the valve when seated and the lower end of the tube communicating with the said passages.

In testimony whereof I hereto affix my signature.

JOSEPH R. MAHAN.